US010669005B2

(12) United States Patent
Cheng et al.

(10) Patent No.: US 10,669,005 B2
(45) Date of Patent: Jun. 2, 2020

(54) SOLID LAMINATE STRINGER

(71) Applicant: The Boeing Company, Chicago, IL (US)

(72) Inventors: Jiangtian Cheng, Mukilteo, WA (US); Ian E. Schroeder, Seattle, WA (US); Gary D. Swanson, Mukilteo, WA (US); Kanna M. Pham, Renton, WA (US); Samuel E. Cregger, Kent, WA (US); Scott M. Spencer, Everett, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 15/907,224

(22) Filed: Feb. 27, 2018

(65) Prior Publication Data

US 2019/0263496 A1    Aug. 29, 2019

(51) Int. Cl.
| | |
|---|---|
| *B32B 3/06* | (2006.01) |
| *B64C 1/06* | (2006.01) |
| *B32B 3/26* | (2006.01) |
| *B64C 3/18* | (2006.01) |
| *B29C 70/30* | (2006.01) |
| *B29C 70/20* | (2006.01) |

(Continued)

(52) U.S. Cl.
CPC ............ *B64C 1/064* (2013.01); *B29C 70/202* (2013.01); *B29C 70/30* (2013.01); *B29D 99/0014* (2013.01); *B32B 3/06* (2013.01); *B32B 3/263* (2013.01); *B32B 5/12* (2013.01); *B64C 3/182* (2013.01); *B29L 2031/3082* (2013.01); *B29L 2031/3085* (2013.01); *B32B 2605/18* (2013.01); *B64C 2001/0072* (2013.01)

(58) Field of Classification Search
CPC ..... Y10T 428/24182; Y10T 428/24612; B64C 1/064; B64C 3/182; B32B 3/263; B32B 5/12

See application file for complete search history.

(56) References Cited

U.S. PATENT DOCUMENTS

| | | |
|---|---|---|
| 9,242,393 B2 | 1/2016 | Bland |
| 2009/0071098 A1 | 3/2009 | Ashton et al. |

(Continued)

FOREIGN PATENT DOCUMENTS

| | | |
|---|---|---|
| EP | 3 045 384 | 7/2016 |

OTHER PUBLICATIONS

Extended European Search Report prepared by the European Patent Office in Application No. 19 15 9705.3, dated Sep. 10, 2019.

*Primary Examiner* — Alexander S Thomas
(74) *Attorney, Agent, or Firm* — McDonnell Boehnen Hulbert & Berghoff

(57) ABSTRACT

A solid laminate stringer includes a base segment that forms a first generally trapezoidal cross section. The solid laminate stringer also includes a transition segment abutting the base segment, with concave sides that are continuous with the sides of the base segment. The solid laminate stringer also includes a top segment abutting the transition segment, where the top segment forms a second generally trapezoidal cross section with sides that are continuous with the concave sides of the transition segment. The solid laminate stringer also includes a first overwrap layer covering the top segment, the transition segment, and at least a portion of the base segment. The solid laminate stringer also includes a second overwrap layer overlapping at least a portion of the first overwrap layer covering the base segment.

20 Claims, 8 Drawing Sheets

(51) Int. Cl.
    *B32B 5/12*       (2006.01)
    *B29D 99/00*      (2010.01)
    B29L 31/30        (2006.01)
    B64C 1/00         (2006.01)

(56) References Cited

U.S. PATENT DOCUMENTS

| | | |
|---|---|---|
| 2011/0088833 A1 | 4/2011 | Guzman et al. |
| 2012/0052247 A1 | 3/2012 | Pook et al. |
| 2014/0186588 A1 | 7/2014 | Victorazzo |
| 2016/0176500 A1 | 6/2016 | Ross et al. |
| 2016/0207607 A1 | 7/2016 | Charles et al. |

SOLID LAMINATE STRINGER

FIELD

The present disclosure generally relates to solid laminate stringers for use in an aircraft structure, and methods for fabricating solid laminate stringers.

BACKGROUND

Solid laminate stringers, such as those formed from carbon fiber reinforced polymer, are commonly used as part of a structural system for aircraft components. For example, a series of stringers may be laminated to the inner skin of an aircraft wing or hull. The structural system may be designed to withstand delamination of the stringers from the inner skin of the aircraft components and thermal cracking of the stringers as the aircraft components are subjected to a combination of aerodynamic loads and temperature changes over time.

What is needed is an improved solid laminate stringer with increased delamination strength and improved resistance to thermal cracking.

SUMMARY

In one example, a solid laminate stringer for use in an aircraft is described, including a base segment having a first plurality of plies of reinforcement material, where the base segment forms a first generally trapezoidal cross section with sides having a first slope angle with respect to a first stacked ply of the base segment. The solid laminate stringer also includes a transition segment abutting the base segment, the transition segment having a second plurality of plies of reinforcement material, where the transition segment forms a cross section having concave sides that are continuous with the sides of the base segment. The solid laminate stringer also includes a top segment abutting the transition segment, the top segment having a third plurality of plies of reinforcement material, where the top segment forms a second generally trapezoidal cross section with sides that are continuous with the concave sides of the transition segment, and where the sides have a second slope angle with respect to the first stacked ply of the base segment that is greater than the first slope angle. The solid laminate stringer also includes a first overwrap layer having at least one ply of reinforcement material, where the first overwrap layer covers the top segment, the transition segment, and at least a portion of the base segment. The solid laminate stringer also includes a second overwrap layer having at least one ply of reinforcement material, where the second overwrap layer overlaps at least a portion of the first overwrap layer covering the base segment.

In another example, a method for fabricating a solid laminate stringer of a structural system is described. The method includes laying up a base segment of the stringer onto a surface, where laying up the base segment includes stacking a first plurality of plies of reinforcement material such that the base segment forms a first generally trapezoidal cross section with sides having a first slope angle with respect to the surface. The method also includes laying up a transition segment of the stringer abutting the base segment, where laying up the transition segment includes stacking a second plurality of plies of reinforcement material such that the transition segment forms a cross section having concave sides that are continuous with the sides of the base segment. The method also includes laying up a top segment of the stringer abutting the transition segment, where laying up the top segment includes stacking a third plurality of plies of reinforcement material such that the top segment forms a second generally trapezoidal cross section that is continuous with the transition segment, with sides having a second slope angle with respect to the surface that is greater than the first slope angle. The method also includes laying up a first overwrap layer, where laying up the first overwrap layer includes stacking at least one ply of reinforcement material over the top segment, the transition segment, and at least a portion of the base segment. The method also includes laying up a second overwrap layer, where laying up the second overwrap layer includes stacking at least one ply of reinforcement material such that the second overwrap layer overlaps at least a portion of the first overwrap layer covering the base segment, and such that the second overwrap layer covers at least a portion of the surface adjacent to the base segment. The method also includes simultaneously curing the base segment, the transition segment, the top segment, the first overwrap layer, and the second overwrap layer.

In another example, a structural system is described including a laminate skin of an aircraft component, where the laminate skin includes an inner surface. The structural system also includes a solid laminate stringer positioned on the inner surface of the laminate skin. The solid laminate stringer includes a base segment including a first plurality of plies of reinforcement material, where the base segment forms a first generally trapezoidal cross section with sides having a first slope angle with respect to the inner surface of the laminate skin. The solid laminate stringer also includes a transition segment abutting the base segment, the transition segment including a second plurality of plies of reinforcement material, where the transition segment forms a cross section having concave sides that are continuous with the sides of the base segment. The solid laminate stringer also includes a top segment abutting the transition segment, the top segment including a third plurality of plies of reinforcement material, where the top segment forms a second generally trapezoidal cross section with sides that are continuous with the concave sides of the transition segment, where the sides have a second slope angle with respect to the inner surface of the laminate skin that is greater than the first slope angle. The solid laminate stringer also includes a first overwrap layer including at least one ply of reinforcement material, where the first overwrap layer covers the top segment, the transition segment, and at least a portion of the base segment. The solid laminate stringer also includes a second overwrap layer including at least one ply of reinforcement material, where the second overwrap layer overlaps at least a portion of the first overwrap layer covering the base segment, and where the second overwrap layer further covers at least a portion of the inner surface of the laminate skin adjacent to the base segment.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed descrip

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include solid laminate stringers and methods for fabricating solid laminate stringers. The stringers may include a series of segments including stacked plies of reinforcing material in a configuration that increases delamination strength and resistance to thermal cracking. The stringers may also include a configuration that facilitates stringer runout, and may reduce local strain or stress in the structural system that includes the stringers.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
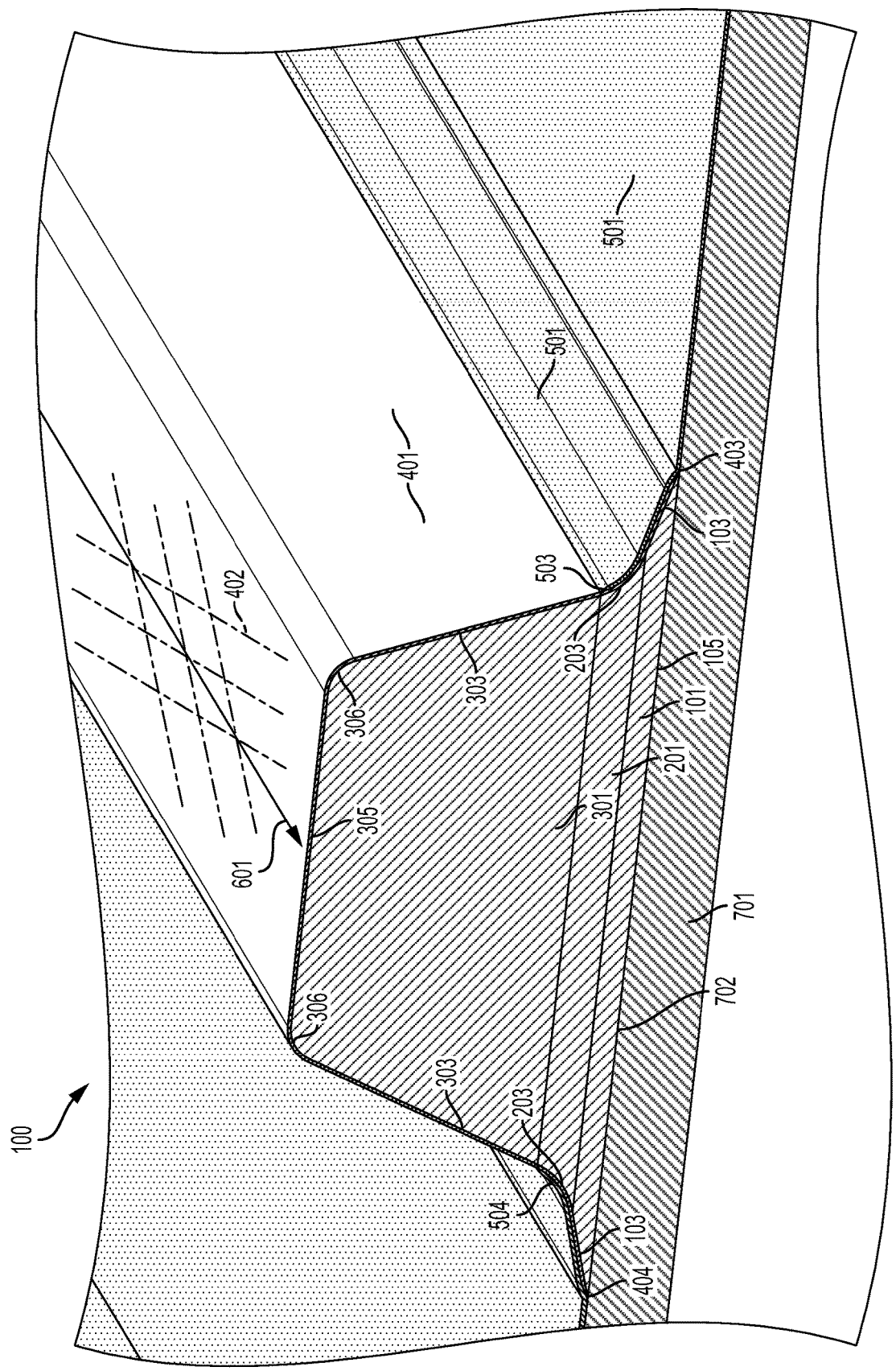
- FIG. 1 illustrates a perspective view of a solid laminate stringer, according to an example implementation.
Figure 2:
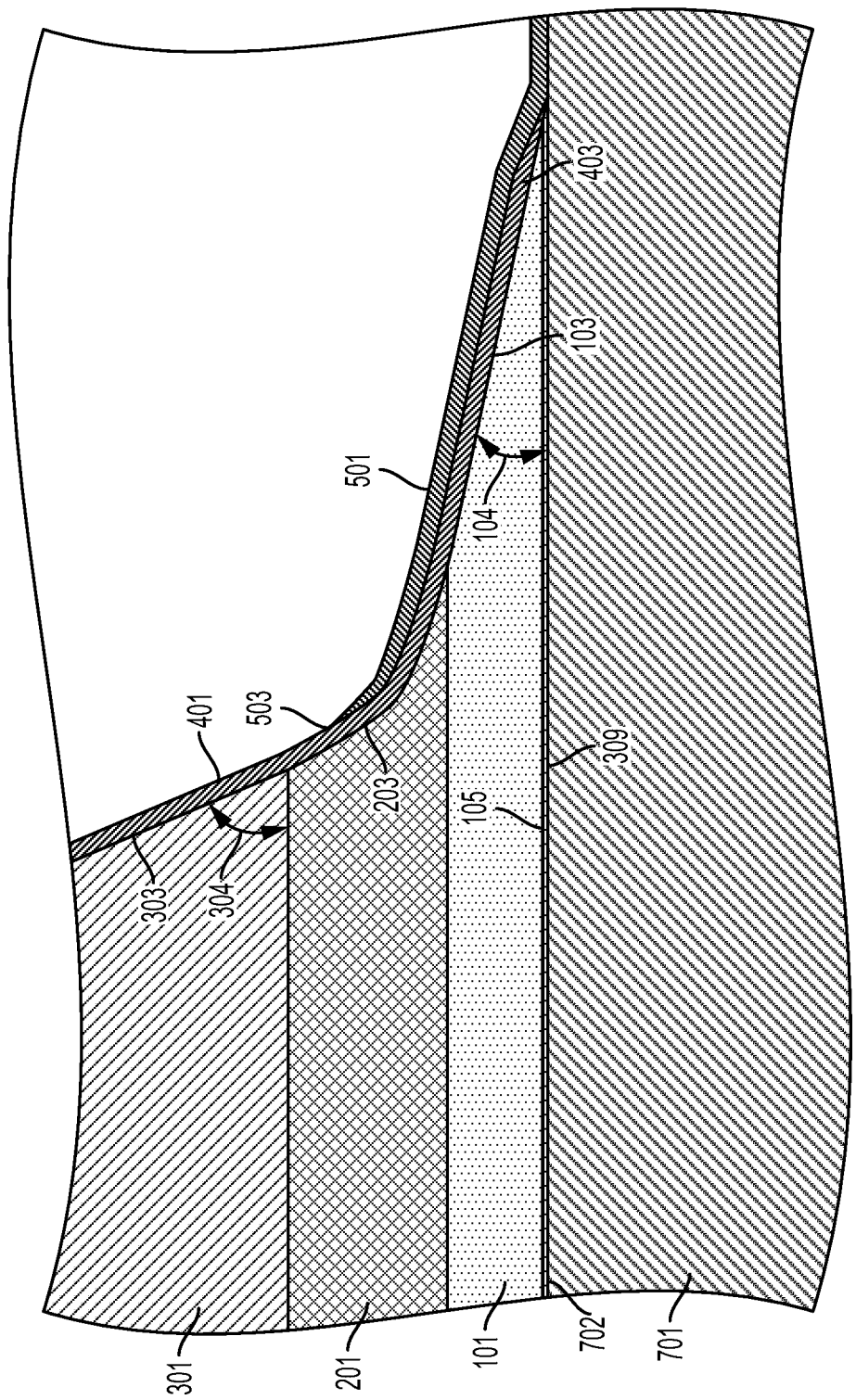
FIG. 2 illustrates a close up view of a solid laminate stringer, according to an example implementation.

Referring now to FIGS. 1 and 2, FIG. 1 shows a perspective view of a solid laminate stringer 100, according to an example implementation. Similarly, FIG. 2 shows a close up view of a solid laminate stringer 100, according to an example implementation. For instance, the stringer 100 may be used as a reinforcing member on the interior laminate skin of an aircraft component, such as the hull or wing. To improve delamination strength, the stringer 100 may be laid up in a series of segments that gradually change in stiffness through a variable fiber concentration in the axial direction of the stringer 100. For instance, as shown in FIG. 1, the stringer 100 may include a base segment 101.

The base segment 101 forms a first generally trapezoidal cross section. For instance, the topmost and bottommost plies in the base segment 101, as shown in FIGS. 1 and 2, may be substantially parallel. The base segment 101 further includes sides 103 having a first slope angle 104 with respect to a first stacked ply 105, i.e. the bottommost ply, of reinforcement material of the base segment 101. For instance, the first stacked ply 105 may contact the inner surface 702 of the laminate skin 701 of the aircraft component, and may form the bottom of the stringer 100 as shown in FIG. 1. Consecutively stacked plies of the base segment 101 may be slightly narrower in width than the first stacked ply 105, resulting in the trapezoidal cross section of base segment 101.

In some implementations, the first slope angle 104 of the base segment 101 may be within a range of between about 10 to 20 degrees. For instance, the first slope angle 104, for both sides 103 of the stringer 100, may be 15 degrees. This may allow the base segment 101 to be flared out wider than the remainder of the stringer 100, which may provide a larger unit area to bear the delamination stresses that may act between the laminate skin 701 and base segment 101, thereby reducing the delamination stresses.

The stringer 100 may further include a transition segment 201 abutting the base segment 101. As shown in FIG. 1, the transition segment 201 is positioned atop the base segment 101. The transition segment 201 forms a cross section having concave sides 203 that are continuous with the sides 103 of the base segment 101. In some implementations, the concave sides 203 of the transition segment 201 may include one or more arcs having a radius of at least about 0.25 inches, which may provide a continuous transition from the sides 103 of the base segment 101 to sides 303 of a top segment 301.

Accordingly, the stringer 100 may include a top segment 301 abutting the transition segment 201. As shown in FIG. 1, the top segment 301 sits atop the transition segment 201 and forms a second generally trapezoidal cross section with sides 303 that are continuous with the concave sides 203 of the transition segment 201. The sides 303 have a second slope angle 304 with respect to the first stacked ply 105 of the base segment 101. The second slope angle 304 is greater than the first slope angle 104, as seen in FIG. 1. In some implementations, the second slope angle 304 may be within a range of between about 60 to 75 degrees. For instance, the second slope angle 304, for both sides 303 of the stringer 100, may be 70 degrees.

In some embodiments, the top segment 301 may include a top surface 305 that joins each side 303 of the top segment 301 at a convex arc 306, which may reduce the likelihood of thermal cracking near or at the upper corners of the stringer 100 in some situations, as discussed below.

The stringer may further include a first overwrap layer 401. The first overwrap layer 401 may cover the top segment 301, the transition segment 201, and at least a portion of the base segment 101. For example, in the example shown in FIGS. 1 and 2, the first overwrap layer 401 extends from a first end 403 to a second end 404, and covers the full width of the base segment 101 on both sides of the stringer 100.

As mentioned above, the convex arc 306 may provide a smooth transition between the sides 303 and a top surface 305 of the top segment 301, which transition is then duplicated in the first overwrap layer 401. For example, the convex arc 306 of the top segment 301 may have a radius of at least about 0.15 inches. This may allow tensile stresses in top segment 301 close to the first overwrap layer 401 may to be more effectively distributed over the convex arc 306. Conversely, a laminate stringer with a sharper transition between the sides and top may experience heighted tensile stresses at this location, which may lead to cracking of the stringer 100.

In some implementations, the stringer 100 may also include a second overwrap layer 501. The second overwrap layer 501 may overlap at least a portion of the first overwrap layer 401 covering the base segment 101. As can be seen in FIG. 2, the second overwrap layer 501 covers a portion of the first overwrap layer 401, as a first end 503 of the second overwrap layer 501 extends to the top of the transition segment 201, as shown in FIG. 1. Alternatively, the first end 503 of the second overwrap layer 501 may taper to an end at approximately the middle of the transition segment 201, as shown in FIG. 2.

The second overwrap layer 501 may also cover a portion of laminate skin 701. Further, because the second overwrap layer 501 is not continuous over the stringer 100, the two sides 103 of the base segment 101 may be covered by two different sections of the second overwrap layer 501. As can be seen in FIG. 1, a second end of the second overwrap layer 501 extends to approximately the top of the transition segment 201.

As noted above, the stringer 100 may be laid up in a series of segments that, from the base segment 101 to the top segment 301, gradually increase in stiffness. Because the laminate skin 701 generally has a lower stiffness that the stringer 100, this arrangement allows the base segment 101 to have stiffness that is closer to that of the laminate skin 701, which may be beneficial. For instance, a difference in the material properties of two adjacent laminate components, such as the laminate skin 701 and the base segment 101, may lead to heightened interlaminate tensile stresses, and may contribute to delamination of the stringer 100 from the laminate skin 701 is some cases. The same may result from a difference in the coefficient of thermal expansion (CTE) between adjacent laminate components. Moreover, in the configuration discussed, an increased stiffness may still be provided in the top segment 301, where the greatest resistance to bending is derived.

The stiffness of the segments in the stringer 100 may be gradually increased by varying, in the respective plies of each segment or overwrap layer, the fiber concentration in the axial direction 601 of the stringer 100. A traditional layup of the stringer 100 may include plies of reinforcing material positioned at angles to the axial direction 601 of the stringer 100 including 0 degrees, 45 degrees, −45 degrees and 90 degrees. The number of plies among each of these angles in a traditional layup may be evenly distributed, for instance. However, the current examples contemplate non-traditional layups with plies arranged at several different angles that affect the fiber concentration in the axial direction 601, as well as traditional 0/45/−45/90 layups that include an uneven distribution of plies, favoring those arranged in the axial direction 601 (i.e. 0 degree plies).

For example, as shown in FIG. 1, the first overwrap layer 401 may include at least one ply of reinforcement material 402 that is arranged with respect to an axial direction 601 of the stringer 100 at one or more angles within ranges of between about 15 to 25 degrees and between about −15 to −25 degrees. For instance, the at least one ply of reinforcement material 402 may include two plies of tape plies arranged at 20 degrees and −20 degrees, respectively, the orientations of which can be seen in FIG. 1. This may result in reducing a mismatch between the CTE of the first overwrap layer 401 as compared to that of the top segment 301, as the plies are arranged relatively close to the axial direction 601 of the stringer 100, or 0 degrees. These properties may approach the orientation of the top segment 301 (discussed below), which may also reduce interlaminate tensile stresses within and between the top segment 301 and the first overwrap layer 401.

Figure 3:
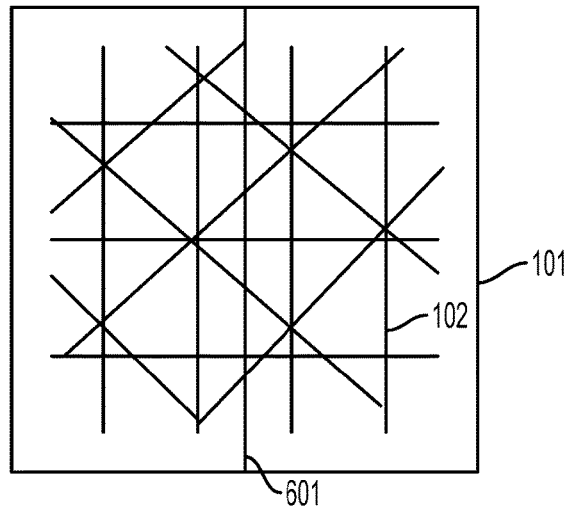
FIG. 3 illustrates a cross-sectional plan view of a base segment of a solid laminate stringer, according to an example implementation.

Similarly, the base segment 101 includes a first plurality of plies of reinforcement material 102, which can be seen in the cross-sectional plan view of the base segment 101 shown in FIG. 3. The first plurality of plies of reinforcement material 102 may include plies arranged with respect to the axial direction 601 of the stringer 100 in a traditional layup, at angles including 0 degrees, 45 degrees, −45 degrees and 90 degrees. However, about 38% to 44% of the first plurality of plies of reinforcement material 102 are arranged at 0 degrees, or parallel to the axial direction 601 of the stringer 100. For instance, 40% of the plies in the first plurality of plies of reinforcement material 102 may be 0 degree plies. This may provide an aggregate stiffness of the base segment 101 that is greater than that of the laminate skin 701, but not so much greater that undesired interlaminate tensile stresses are introduced.

Figure 4:
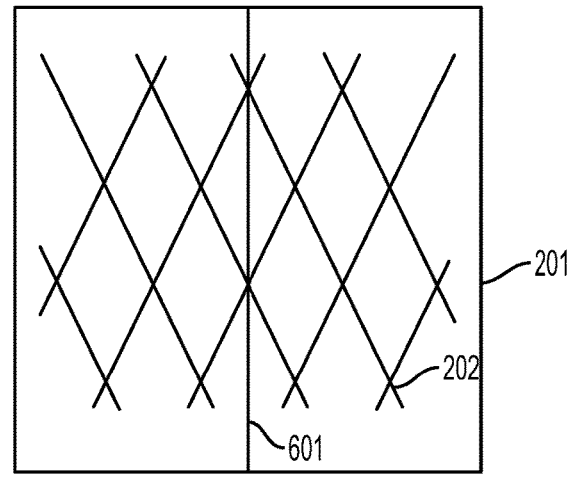
FIG. 4 illustrates a cross-sectional plan view of a transition segment of a solid laminate stringer, according to an example implementation.

Further, the transition segment 201 includes a second plurality of plies of reinforcement material 202, an example of which can be seen in the cross-sectional plan view of the transition segment 201 shown in FIG. 4. For instance, the second plurality of plies of reinforcement material 202 may include plies arranged in a non-traditional layup, arranged with respect to the axial direction 601 of the stringer 100 at angles within ranges of between about 25 to 35 degrees and between about −25 to −35 degrees. In some implementations, for instance, the second plurality of plies of reinforcement material 202 may be arranged at 30 degrees and −30 degrees, as in FIG. 4. This arrangement may provide a greater stiffness in the transition segment 201 than the arrangement of the base segment 101 discussed above, due to a greater resulting fiber concentration in the axial direction 601.

Alternatively, the second plurality of plies of reinforcement material 202 may include plies arranged in a traditional 0/45/−45/90 degree layup, but with about 42% to 48% of the second plurality of plies of reinforcement material 202 arranged at 0 degrees. For instance, 45% of the plies in the second plurality of plies of reinforcement material 202 may be 0 degree plies. Again, this may provide a greater stiffness in the transition segment 201 than the arrangement of the base segment 101 discussed above, but a stiffness that is less than that of the top segment 301, discussed below.

Figure 5:
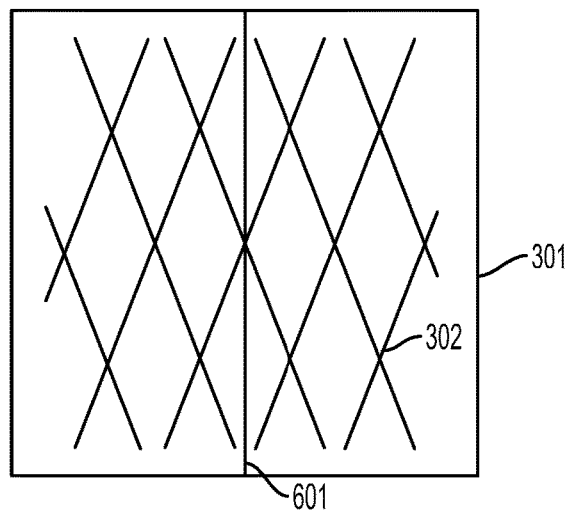
FIG. 5 illustrates a cross-sectional plan view of a top segment of a solid laminate stringer, according to an example implementation.

The top segment 301 includes a third plurality of plies of reinforcement material 302, an example of which can be seen in the cross-sectional plan view of the top segment 301 shown in FIG. 5. For example, the third plurality of plies of reinforcement material 302 may include plies arranged in a non-traditional layup with respect to the axial direction 601 of the stringer 100 at angles within ranges of between about 20 to 35 degrees and between about −20 to −35 degrees. In some implementations, for instance, the third plurality of plies of reinforcement material 302 may be arranged at 22 degrees and −22 degrees, as in FIG. 5. This may provide a greater stiffness in the top segment 301 than either arrangement of the transition segment 201 discussed above, due to a greater resulting fiber concentration in the axial direction 601.

Alternatively, the third plurality of plies of reinforcement material 302 may include plies arranged in a non-traditional layup with respect to the axial direction 601 of the stringer 100 at a combination of angles including 10 degrees, −10 degrees, 60 degrees, and −60 degrees. Again, this may result in a greater fiber concentration in the axial direction 601 than the options discussed for the transition segment 201 above.

As yet another example, the third plurality of plies of reinforcement material 302 may include plies arranged in a traditional 0/45/−45/90 degree layup, but with about 45% to 60% of the third plurality of plies of reinforcement material 302 arranged at 0 degrees. For instance, 55% of the plies in the third plurality of plies of reinforcement material 302 may be 0 degree plies, a greater proportion than discussed for the transition segment 201 above, resulting in a greater stiffness of the top segment 301.

Figure 6:
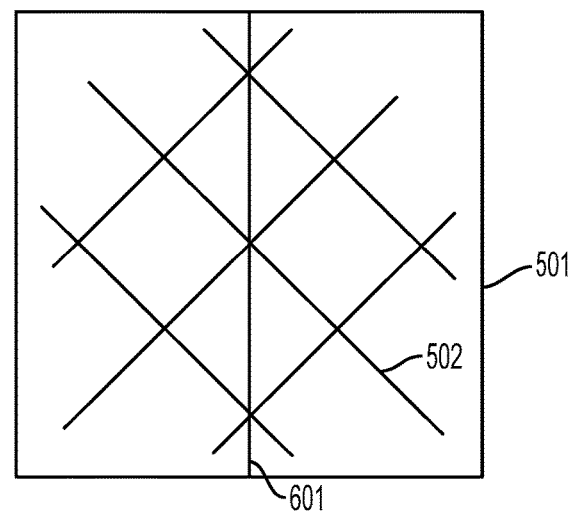
FIG. 6 illustrates a cross-sectional plan view of a second overwrap layer of a solid laminate stringer, according to an example implementation.

The second overwrap layer 501 includes at least one ply of reinforcement material 502, an example of which can be seen in the cross-sectional plan view of the second overwrap layer shown in FIG. 6. For instance, at least one ply of reinforcement material 502 may include two plies of fabric arranged at −45 degrees and 45 degrees respectively, as in FIG. 6.

Figure 7:
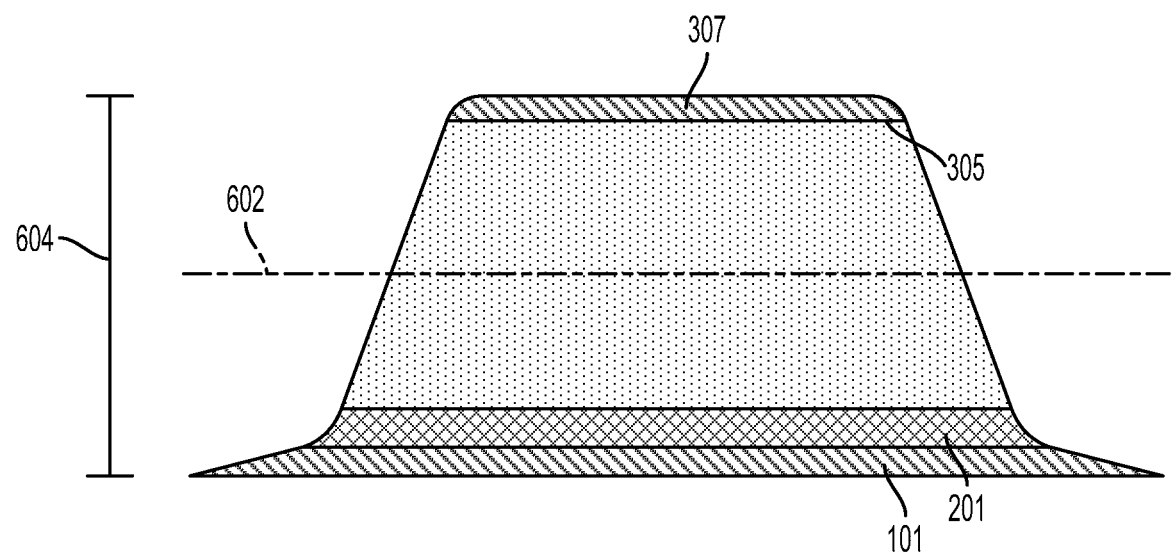
FIG. 7 illustrates a line of symmetry through a solid laminate stringer, according to an example implementation.
Figure 8:
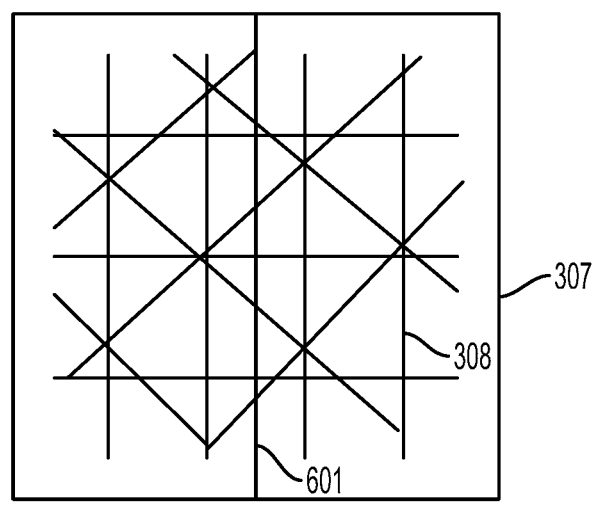
FIG. 8 illustrates a cross-sectional plan view of a cap charge of a solid laminate stringer, according to an example implementation.

Referring now to FIG. 7, in some implementations, the top segment 301 of the solid laminate stringer 100 may further include a cap charge 307 abutting the third plurality of plies of reinforcement material 302. For example, the cap charge 307 may be positioned atop the top surface 305 of the top segment 301, as in FIG. 7. Further, the cap charge 307 includes a fourth plurality of plies of reinforcement material 308, which may be arranged with respect to the axial direction 601 of the stringer 100 at angles that are substantially the same as the angles of the first plurality of plies of reinforcement material 102. For example, as can be seen in FIG. 8, the fourth plurality of plies of reinforcement material 308 are arranged at the same 0/45/−45/90 degree angles as the first plurality of plies of reinforcement material 102 in the base segment 101, shown in FIG. 3. Moreover, the distribution of plies between the traditional layup angles may be substantially the same as the base segment 101 as well. For instance, like the base segment 101, 40% of the plies in the fourth plurality of plies of reinforcement material 308 may be 0 degree plies.

In this arrangement of the stringer 100, where the cap charge 307 mirrors the base segment 101, the arrangement of the first, second, third and fourth plurality of plies with respect to the axial direction 601 of the stringer 100 may be approximately symmetric about a line of symmetry 602 between the base segment 101 and the cap charge 307, as shown in FIG. 7. The symmetry may be approximate due to the transition segment 201, which does not have a corresponding segment near the top of the stringer 100. However, the transition segment 201 may contribute a relatively small portion of the height 604 of the stringer 100, and thus the deviation from symmetry about the line of symmetry 602 may be relatively small.

Figure 9:
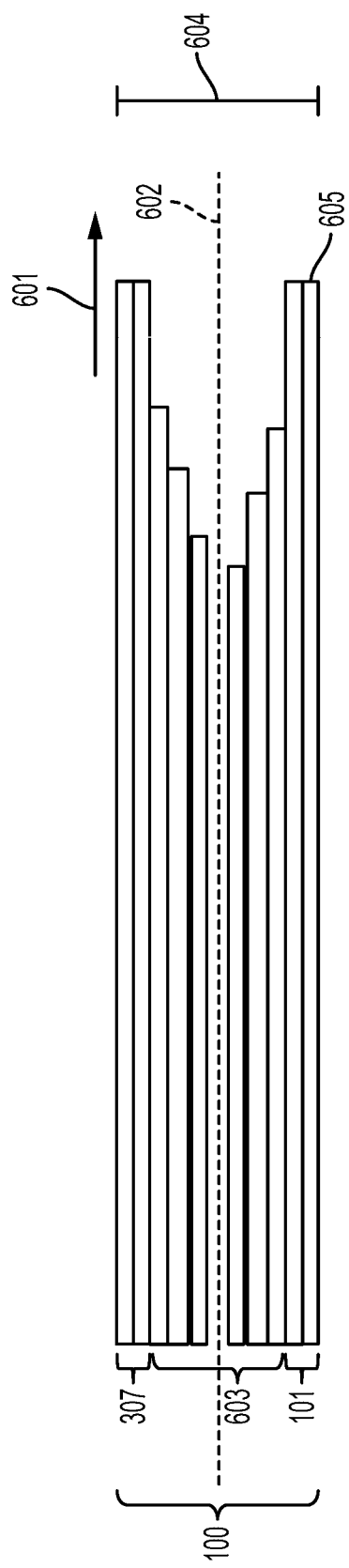
FIG. 9 illustrates a schematic view of a plurality of terminating plies in a runout portion of a solid laminate stringer, according to an example implementation.

The approximately symmetric arrangement of plies in the stringer 100 discussed above may be advantageous at the runout ends of the stringer 100. For example, it may allow for a plurality of terminating plies 603, located in the middle of the stringer 100, to be successively terminated in the axial direction 601 of the stringer 100, approximately at the line of symmetry 602, as shown in FIG. 9. For example, as plies are terminated from the middle of the stringer 100, the stringer 100 may remain approximately symmetric about the line of symmetry 602. Further, each ply in the plurality of terminating plies 603 may be terminated a shorter axial distance from the runout end 605 of the stringer 100, which may reduce the height 604 of the stringer 100 along the axial direction 601 of the stringer 100. The plies may alternate in being terminated from just above the line of symmetry 602 to just below the line of symmetry 602, which may help to maintain the approximate symmetry of the remaining plies.

For purposes of illustrating the stepwise configuration of the plurality of successive terminating plies 603, the schematic view shown in FIG. 9 does not illustrate the remaining plies converging at the line of symmetry 602, and thereby reducing the height 604 of the stringer 100. However, this effect can be seen in FIGS. 10 and 11.

Figure 10:
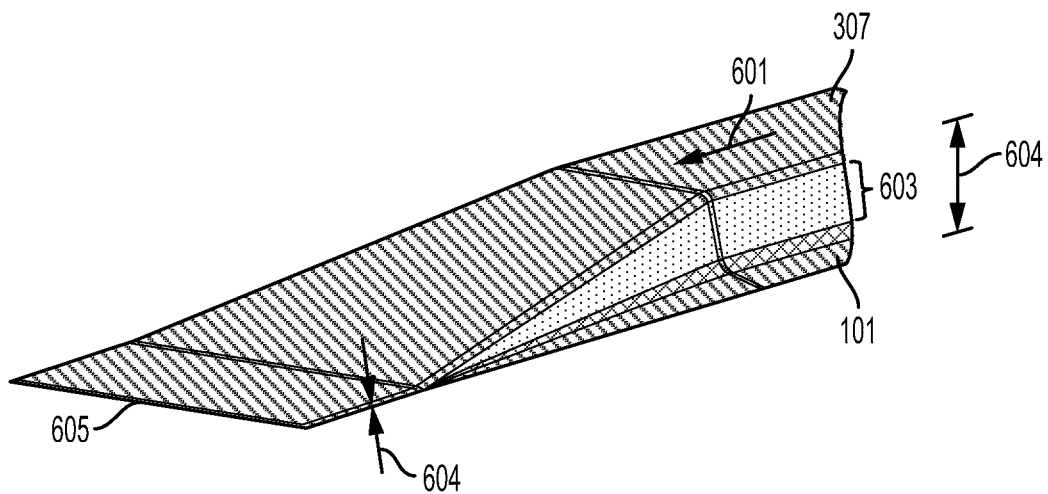
FIG. 10 illustrates a perspective view of a runout portion of a solid laminate stringer, according to an example implementation.
Figure 11:
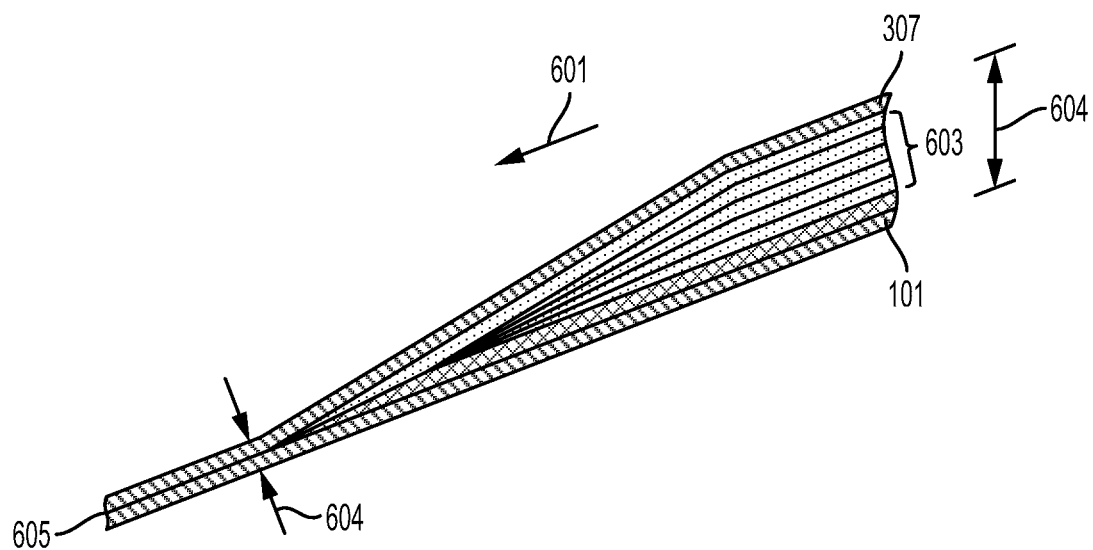
FIG. 11 illustrates a cross-sectional view of a runout portion of a solid laminate stringer, according to an example implementation.

FIGS. 10 and 11 show perspective and cross-section views, respectively, of a runout portion of the stringer 100, approaching the runout end 605. As the plurality of terminating plies 603 are terminated from the line of symmetry 602, as discussed above, the height 604 of the stringer 100 is reduced in the direction of the runout end 605. As shown in FIG. 10, the width of the stringer 100 may also increase as the height 604 decreases toward the runout end 605. Further, the cap charge 307 and the base segment 101 remain the uppermost and lowermost plies of the stringer 100, until they are the only plies remaining in the stringer 100. Other arrangements are also possible.

Figure 12:
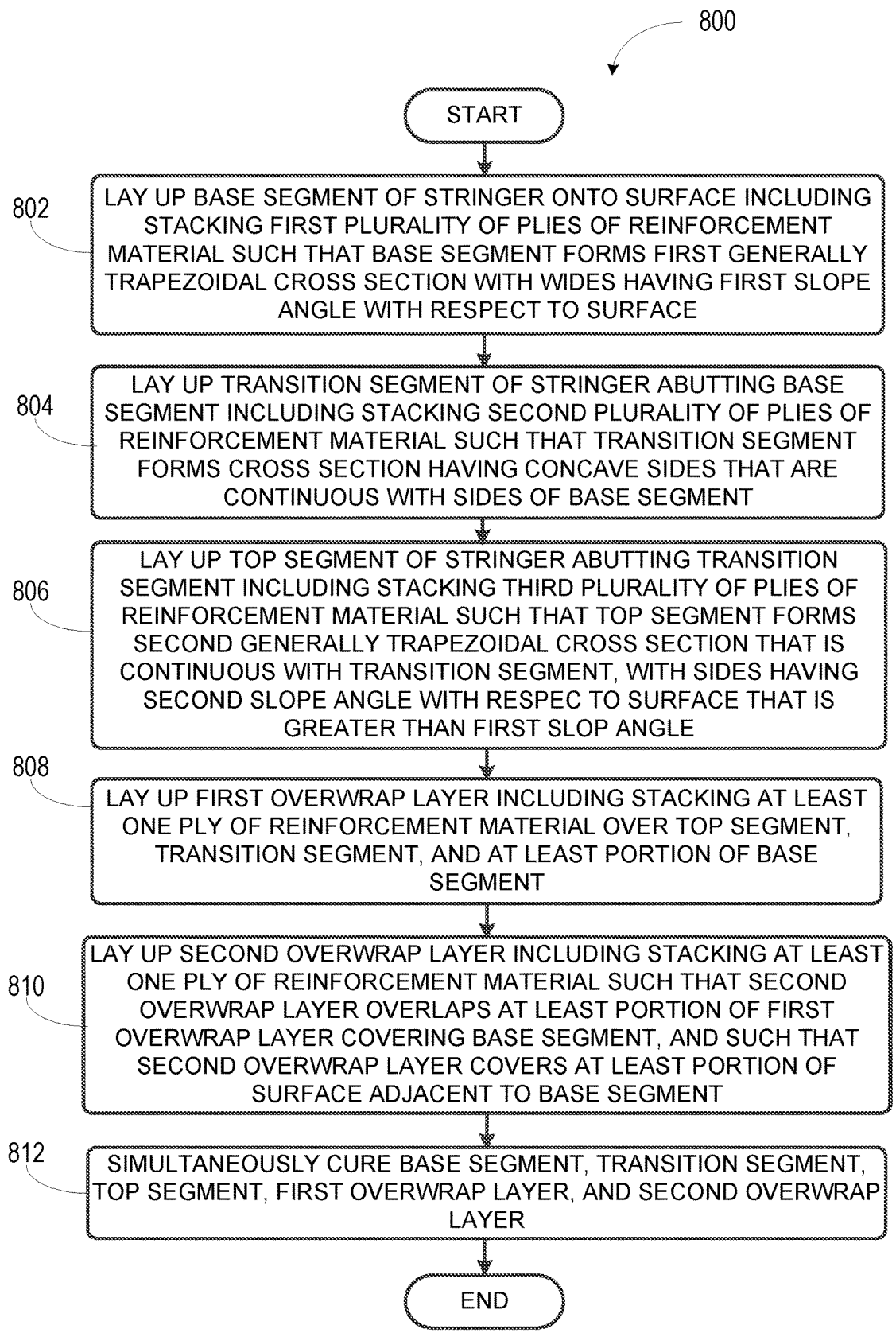
FIG. 12 illustrates an elastic center of gravity of a solid laminate stringer, according to an example implementation.

Turning now to FIG. 12, a flowchart of a method 800 for fabricating a solid laminate stringer of a structural system is shown, according to an example implementation. Method 800 shown in FIG. 12 presents an example of a method that, for instance, could be used with the stringer 100, as shown in FIGS. 1-11 and discussed above. It should be understood that for this and other processes and methods disclosed herein, flowcharts show functionality and operation of one possible implementation of present examples. In this regard, each block in the flowchart may represent a module, a segment, or a portion of program code, which includes one or more instructions executable by a processor for implementing or causing specific logical functions or steps in the process. For example, the method 800 may be implemented by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

Figure 13:
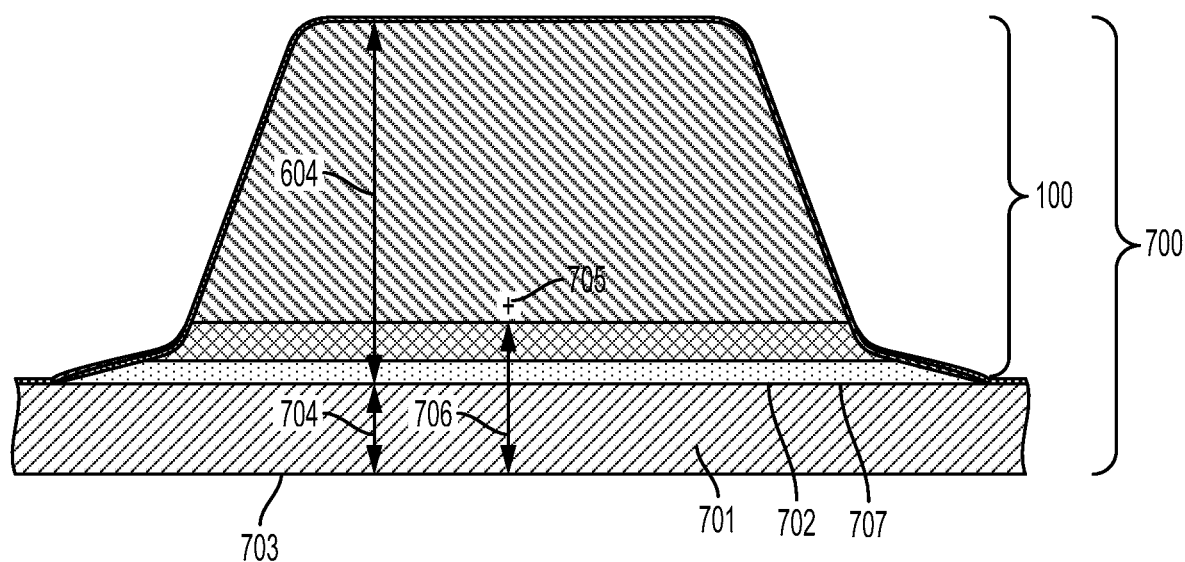
FIG. 13 illustrates an elastic center of gravity of a runout portion of a solid laminate stringer, according to an example implementation.
Figure 14:
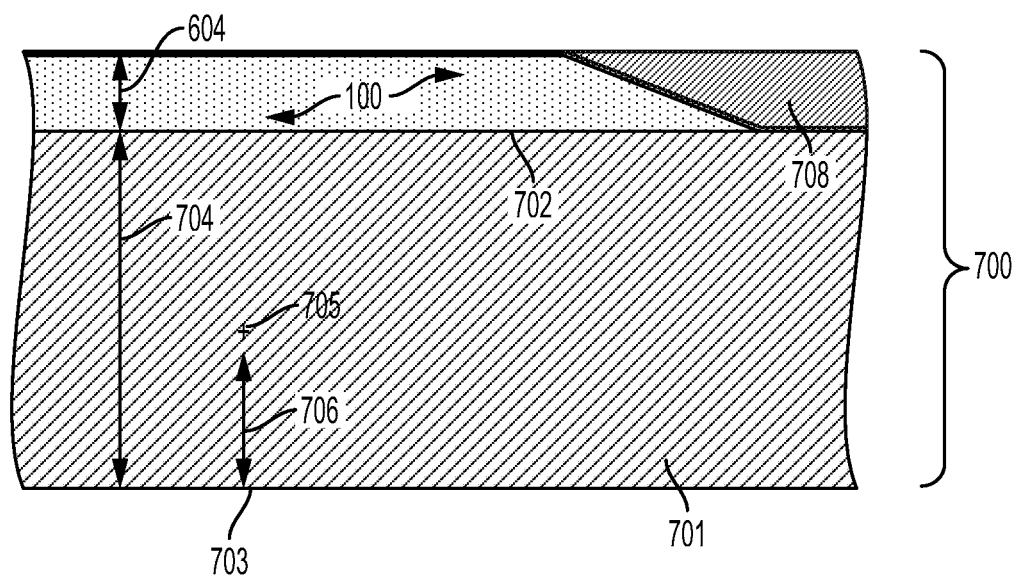
FIG. 14 shows a flowchart of an example method for fabricating a solid laminate stringer of a structural system, according to an example implementation.

At block 802, the method 800 includes laying up a base segment 101 of the stringer 100 of a structural system 700 onto a surface 707, as can be seen with reference to FIGS. 13 and 14. The surface 707 may be, for instance, the inner surface 702 of the laminate skin 701 of an aircraft component as discussed in the examples above. However, the surface 707 could be any other surface suitable for reinforcement by a solid laminate stringer such as the stringer 100, which may, in combination, form the structural system 700.

As discussed in the examples above, laying up the base segment 101 may include stacking a first plurality of plies of reinforcement material 102 such that the base segment 101 forms a first generally trapezoidal cross section with sides 103 having a first slope angle 104 with respect to the surface 707.

In some implementations, laying up the base segment 101 may include stacking the first plurality of plies of reinforcement material 102 such that the first slope angle 104 of the base segment 101 is within a range of between about 10-15 degrees. Further, laying up the base segment 101 may also include arranging the first plurality of plies of reinforcement material 102 with respect to an axial direction 601 of the stringer 100 at angles including 0/45/−45/90 degrees. About 38% to 44% of the first plurality of plies of reinforcement material 102 in the base segment 101 may be arranged at 0 degrees, as discussed previously and shown in FIG. 3.

At block 804, the method 800 includes laying up a transition segment 201 of the stringer 100 abutting the base segment 101, which may include stacking a second plurality of plies of reinforcement material 202 such that the transition segment 201 forms a cross section having concave sides 203 that are continuous with the sides 103 of the base segment 101, as discussed previously and shown in FIGS. 1 and 2.

Further, laying up the transition segment 201 may include stacking the second plurality of plies of reinforcement material 202 such that the concave sides 203 of the transition segment 201 include one or more arcs having a radius of at least about 0.25 inches. Laying up the transition segment 201 may also include arranging the second plurality of plies of reinforcement material 202 with respect to an axial direction 601 of the stringer 100 at angles within ranges of between about 25 to 35 degrees and between about −25 to −35 degrees, as discussed above. Alternatively, the second plurality of plies of reinforcement material 202 may be arranged at angles including 0/45/−45/90 degrees, where about 42% to 48% of the second plurality of plies of reinforcement material 202 are arranged at 0 degrees.

At block 806, the method 800 includes laying up a top segment 301 of the stringer 100 abutting the transition segment 201, which may include stacking a third plurality of plies of reinforcement material 302 such that the top segment 301 forms a second generally trapezoidal cross section that is continuous with the transition segment 201. Further, the top segment may include sides 303 having a second slope angle 304 with respect to the surface 707 that is greater than the first slope angle 104, as discussed previously and as generally shown in FIGS. 1 and 2.

Further, laying up the top segment 301 may include stacking the third plurality of plies of reinforcement material 302 such that the second slope angle 304 of the top segment 301 is within a range of between about 60 to 75 degrees, as noted previously. Laying up the top segment 301 may also include arranging the third plurality of plies of reinforcement material 302 with respect to the axial direction 601 of the stringer 100 at angles within ranges of between about 20 to 35 degrees and between about −20 to −35 degrees, or at angles including 10 degrees, −10 degrees, 60 degrees, and −60 degrees, as contemplated in previous examples. Further, the third plurality of plies of reinforcement material 302 may be arranged at angles including 0/45/−45/90 degrees, wherein about 45% to 60% of the third plurality of plies of reinforcement material 302 are arranged at 0 degrees.

At block 808, the method 800 includes laying up a first overwrap layer 401, which may include stacking at least one ply of reinforcement material 402 over the top segment 301, the transition segment 201, and at least a portion of the base segment 101.

At block 810, the method 800 includes laying up a second overwrap layer 501, which may include stacking at least one ply of reinforcement material 502 such that the second overwrap layer 501 overlaps at least a portion of the first overwrap layer 401 covering the base segment 101, and such that the second overwrap layer 501 covers at least a portion of the surface 707 adjacent to the base segment 101, similar to the examples discussed above.

At block 812, the method 800 includes simultaneously curing the base segment 101, the transition segment 201, the top segment 301, the first overwrap layer 401, and the second overwrap layer 501. In some implementations, the surface 707 may be an inner surface 702 of a laminate skin 701 of an aircraft, as discussed above. Additionally, before laying up the base segment 101 of the stringer 100, the method 800 may involve laying up the laminate skin 701 of the aircraft component. Moreover, simultaneously curing the base segment 101, the transition segment 201, the top segment 301, the first overwrap layer 401, and the second overwrap layer 501 may also include simultaneously curing the laminate skin 701 of the aircraft component.

In some implementations, laying up the top segment 301 of the stringer 100 of the structural system 700 may include laying up a cap charge 307 abutting the third plurality of plies of reinforcement material 302. As discussed above and as shown in FIG. 7-8, laying up the cap charge 307 may include stacking a fourth plurality of plies of reinforcement material 308 in an arrangement with respect to the axial direction 601 of the stringer 100 that is substantially the same as an arrangement of the first plurality of plies of reinforcement material 102 with respect to the axial direction 601 of the stringer 100. As a result, the structural system 700 may include an arrangement of the first, second, third and fourth plurality of plies with respect to the axial direction 601 of the stringer 100 that is approximately symmetric about a line of symmetry 602 between the base segment 101 and the cap charge 307, as discussed previously.

The method 800 may also include terminating a plurality of terminating plies 603 in the axial direction 601 of the stringer 100. As noted above with respect to FIG. 9, each successive terminating ply may be terminated a shorter axial distance from a runout end 605 of the stringer 100. Further, each terminating ply in the plurality of terminating plies 603 may be terminated approximately at the line of symmetry 602 such that a height 604 of the stringer 100 is reduced along the axial direction 601.

In some embodiments, the method 800 may also include increasing a thickness 704 of the laminate skin 701 along the axial direction 601 of the stringer 100 as the height 604 of the stringer 100 is reduced. For example, the structural system 700, including the laminate skin 701 and the stringer 100, may include an outer mold line 703, which is shown in FIGS. 12-13. The structural system 700 may further include an elastic center of gravity 705 that is located a distance 706 from the outer mold line 703 of the laminate skin 701.

FIG. 13 shows an example of the structural system 700, including an indication of the elastic center of gravity 705 where the stringer 100. As plies are terminated from the stringer 100, as discussed above, the reduction in mass may cause the elastic center of gravity 705 to drift downward, as the distance 706 is reduced. Accordingly, this may cause the bending moment that is resisted along the axial direction 601 of the stringer 100 to act at a different location within the structural system 700. This in turn may generate internal loads on the structural system 700, which may be undesirable. Consequently, the thickness 704 of the laminate skin 701 may be increased to offset the reduced height 604 of the stringer 100.

However, because the stringer 100 generally has a greater stiffness than the laminate skin 701, as discussed above, it may not be possible to increase the thickness 704 of the laminate skin 701 at a rate sufficient to compensate for the runout of the stringer 100. Therefore, in some embodiments, the method 800 may include laying up structural fill material 708 on the inner surface 702 of the laminate skin 701 and adjacent to the stringer 100 where the height 604 of the stringer 100 is reduced. The structural fill material 708 may balance the runout of the stringer 100 such that the distance 706 from the outer mold line 703 to the elastic center of gravity 705 is approximately constant along the axial direction 601 of the stringer 100. In this way, the structural system 700 may minimize internal loads that may be generated if the bending moment acts at a different location for the elastic center of gravity along different points in the structural system 700.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A solid laminate stringer for use in an aircraft, the stringer comprising:
   a base segment comprising a first plurality of plies of reinforcement material, wherein the base segment forms a first generally trapezoidal cross section with sides having a first slope angle with respect to a first stacked ply of the base segment;
   a transition segment abutting the base segment, the transition segment comprising a second plurality of plies of reinforcement material, wherein the transition segment forms a cross section having concave sides that are continuous with the sides of the base segment;
   a top segment abutting the transition segment, the top segment comprising a third plurality of plies of reinforcement material, wherein the top segment forms a second generally trapezoidal cross section with sides that are continuous with the concave sides of the transition segment, and wherein the sides have a second slope angle with respect to the first stacked ply of the base segment that is greater than the first slope angle;
   a first overwrap layer comprising at least one ply of reinforcement material, wherein the first overwrap layer covers the top segment, the transition segment, and at least a portion of the base segment; and
   a second overwrap layer comprising at least one ply of reinforcement material, wherein the second overwrap layer overlaps at least a portion of the first overwrap layer covering the base segment.

2. The solid laminate stringer of claim 1, wherein the at least one ply of reinforcement material of the first overwrap layer is arranged with respect to an axial direction of the stringer at one or more angles within ranges of between about 15 to 25 degrees and between about −15 to −25 degrees.

3. The solid laminate stringer of claim 1, wherein the top segment comprises a top surface that joins each side of the top segment at a convex arc having a radius of at least about 0.15 inches.

4. The solid laminate stringer of claim 1, wherein the concave sides of the transition segment comprise one or more arcs having a radius of at least about 0.25 inches, and wherein the second plurality of plies of reinforcement material comprises plies arranged with respect to an axial direction of the stringer at angles within ranges of between about 25 to 35 degrees and between about −25 to −35 degrees, or at angles including 0 degrees, 45 degrees, −45 degrees and 90 degrees, wherein about 42% to 48% of the second plurality of plies of reinforcement material are arranged at 0 degrees.

5. The solid laminate stringer of claim 1, wherein the second slope angle of the top segment is within a range of between about 60 to 75 degrees, and wherein the third plurality of plies of reinforcement material comprises plies arranged with respect to an axial direction of the stringer at angles within ranges of between about 20 to 35 degrees and between about −20 to −35 degrees, or at angles including 10 degrees, −10 degrees, 60 degrees, and −60 degrees, or at angles including 0 degrees, 45 degrees, −45 degrees and 90 degrees, wherein about 45% to 60% of the third plurality of plies of reinforcement material are arranged at 0 degrees.

6. The solid laminate stringer of claim 1, wherein the first slope angle of the base segment is within a range of between about 10 to 20 degrees, and wherein the first plurality of plies of reinforcement material comprises plies arranged with respect to an axial direction of the stringer at angles including 0 degrees, 45 degrees, −45 degrees and 90 degrees, wherein about 38% to 44% of the first plurality of plies of reinforcement material are arranged at 0 degrees.

7. The solid laminate stringer of claim 6, wherein the top segment further comprises a cap charge abutting the third plurality of plies of reinforcement material, wherein the cap charge comprises a fourth plurality of plies of reinforcement material, wherein the fourth plurality of plies of reinforcement material are arranged with respect to the axial direction of the stringer at angles that are substantially the same as the angles of the first plurality of plies of reinforcement material.

8. The solid laminate stringer of claim 7, wherein an arrangement of the first, second, third and fourth plurality of plies with respect to the axial direction of the stringer is approximately symmetric about a line of symmetry between the base segment and the cap charge, wherein a plurality of terminating plies are successively terminated in the axial direction of the stringer, approximately at the line of symmetry, such that a height of the stringer is reduced along the axial direction of the stringer.

9. A method for fabricating a solid laminate stringer of a structural system, the method comprising:
   laying up a base segment of the stringer onto a surface, wherein laying up the base segment comprises stacking a first plurality of plies of reinforcement material such that the base segment forms a first generally trapezoidal cross section with sides having a first slope angle with respect to the surface;
   laying up a transition segment of the stringer abutting the base segment, wherein laying up the transition segment comprises stacking a second plurality of plies of reinforcement material such that the transition segment forms a cross section having concave sides that are continuous with the sides of the base segment;

laying up a top segment of the stringer abutting the transition segment, wherein laying up the top segment comprises stacking a third plurality of plies of reinforcement material such that the top segment forms a second generally trapezoidal cross section that is continuous with the transition segment, with sides having a second slope angle with respect to the surface that is greater than the first slope angle;

laying up a first overwrap layer, wherein laying up the first overwrap layer comprises stacking at least one ply of reinforcement material over the top segment, the transition segment, and at least a portion of the base segment;

laying up a second overwrap layer, wherein laying up the second overwrap layer comprises stacking at least one ply of reinforcement material such that the second overwrap layer overlaps at least a portion of the first overwrap layer covering the base segment, and such that the second overwrap layer covers at least a portion of the surface adjacent to the base segment; and simultaneously curing the base segment, the transition segment, the top segment, the first overwrap layer, and the second overwrap layer.

10. The method of claim 9, wherein laying up the transition segment further comprises:

stacking the second plurality of plies of reinforcement material such that the concave sides of the transition segment comprise one or more arcs having a radius of at least about 0.25 inches; and arranging the second plurality of plies of reinforcement material with respect to an axial direction of the stringer at angles within ranges of between about 25 to 35 degrees and between about −25 to −35 degrees, or at angles including 0 degrees, 45 degrees, −45 degrees and 90 degrees, wherein about 42% to 48% of the second plurality of plies of reinforcement material are arranged at 0 degrees.

11. The method of claim 9, wherein laying up the top segment further comprises:

stacking the third plurality of plies of reinforcement material such that the second slope angle of the top segment is within a range of between about 60 to 75 degrees; and arranging the third plurality of plies of reinforcement material with respect to an axial direction of the stringer at angles within ranges of between about 20 to 35 degrees and between about −20 to −35 degrees, or at angles including 10 degrees, −10 degrees, 60 degrees, and −60 degrees, or at angles including 0 degrees, 45 degrees, −45 degrees and 90 degrees, wherein about 45% to 60% of the third plurality of plies of reinforcement material are arranged at 0 degrees.

12. The method of claim 9, wherein laying up the base segment further comprises:

stacking the first plurality of plies of reinforcement material such that the first slope angle of the base segment is within a range of between about 10 to 20 degrees; and arranging the first plurality of plies of reinforcement material with respect to an axial direction of the stringer at angles including 0 degrees, 45 degrees, −45 degrees and 90 degrees, wherein about 38% to 44% of the first plurality of plies of reinforcement material are arranged at 0 degrees.

13. The method of claim 9, wherein the surface is an inner surface of a laminate skin of an aircraft component, wherein the method further comprises:

before laying up the base segment of the stringer, laying up the laminate skin of the aircraft component, wherein simultaneously curing the base segment, the transition segment, the top segment, the first overwrap layer, and the second overwrap layer further comprises simultaneously curing the laminate skin of the aircraft component.

14. The method of claim 13, wherein laying up the top segment of the stringer further comprises laying up a cap charge abutting the third plurality of plies of reinforcement material, wherein laying up the cap charge comprises stacking a fourth plurality of plies of reinforcement material in an arrangement with respect to an axial direction of the stringer that is substantially the same as an arrangement of the first plurality of plies of reinforcement material with respect to the axial direction of the stringer, and such that an arrangement of the first, second, third and fourth plurality of plies with respect to the axial direction of the stringer are approximately symmetric about a line of symmetry between the base segment and the cap charge.

15. The method of claim 14, further comprising:

successively terminating a plurality of terminating plies in the axial direction of the stringer, wherein each successive terminating ply is terminated a shorter axial distance from a runout end of the stringer, and wherein each terminating ply in the plurality of terminating plies is terminated approximately at the line of symmetry such that a height of the stringer is reduced along the axial direction; and increasing a thickness of the laminate skin along the axial direction of the stringer as the height of the stringer is reduced.

16. The method of claim 15, wherein the laminate skin comprises an outer mold line, and wherein the structural system comprises an elastic center of gravity located a distance from the outer mold line of the laminate skin, and wherein the method further comprises:

laying up structural fill material on the inner surface of the laminate skin and adjacent to the stringer where the height of the stringer is reduced such that the distance from the outer mold line to the elastic center of gravity is approximately constant along the axial direction of the stringer.

17. A structural system comprising:

a laminate skin of an aircraft component, wherein the laminate skin comprises an inner surface;

a solid laminate stringer positioned on the inner surface of the laminate skin, the solid laminate stringer comprising:

a base segment comprising a first plurality of plies of reinforcement material, wherein the base segment forms a first generally trapezoidal cross section with sides having a first slope angle with respect to the inner surface of the laminate skin;

a transition segment abutting the base segment, the transition segment comprising a second plurality of plies of reinforcement material, wherein the transition segment forms a cross section having concave sides that are continuous with the sides of the base segment;

a top segment abutting the transition segment, the top segment comprising a third plurality of plies of reinforcement material, wherein the top segment forms a second generally trapezoidal cross section with sides that are continuous with the concave sides of the transition segment, and wherein the sides have a second slope angle with respect to the inner surface of the laminate skin that is greater than the first slope angle;

a first overwrap layer comprising at least one ply of reinforcement material, wherein the first overwrap layer covers the top segment, the transition segment, and at least a portion of the base segment; and a second overwrap layer comprising at least one ply of reinforcement material, wherein the second overwrap layer overlaps at least a portion of the first overwrap layer covering the base segment, and wherein the second overwrap layer further covers at least a portion of the inner surface of the laminate skin adjacent to the base segment.

18. The structural system of claim 17, wherein the top segment further comprises a cap charge abutting the third plurality of plies of reinforcement material, wherein the cap charge comprises a fourth plurality of plies of reinforcement material, wherein the fourth plurality of plies of reinforcement material comprises an arrangement with respect to an axial direction of the stringer that is substantially the same as an arrangement of the first plurality of plies of reinforcement material with respect to the axial direction of the stringer.

19. The structural system of claim 18, wherein an arrangement of the first, second, third and fourth plurality of plies with respect to the axial direction of the stringer are approximately symmetric about a line of symmetry between the base segment and the cap charge, wherein a plurality of terminating plies are successively terminated in the axial direction of the stringer, approximately at the line of symmetry, such that a height of the stringer is reduced along the axial direction of the stringer, and wherein a thickness of the laminate skin is concurrently increased along the axial direction of the stringer.

20. The structural system of claim 19, wherein the laminate skin comprises an outer mold line, and wherein the structural system comprises an elastic center of gravity located a distance from the outer mold line of the laminate skin, and wherein the structural system further comprises:

structural fill material positioned on the inner surface of the laminate skin and adjacent to the stringer where the height of the stringer is reduced, such that the distance from the outer mold line to the elastic center of gravity is approximately constant along the axial direction of the stringer.

* * * * *